US012024085B2

(12) United States Patent
Höfler et al.

(10) Patent No.: US 12,024,085 B2
(45) Date of Patent: Jul. 2, 2024

(54) ADJUSTMENT DEVICE FOR MOTOR VEHICLE HEADLIGHT

(71) Applicant: ZKW Group GmbH, Wieselburg (AT)

(72) Inventors: Thomas Höfler, Wieselburg (AT); Leopold Pritzl, Bergland (AT); Martin Artner, Maria Taferl (AT); Thomas Petzold, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/200,115

(22) Filed: May 22, 2023

(65) Prior Publication Data

US 2023/0382290 A1    Nov. 30, 2023

(30) Foreign Application Priority Data

May 25, 2022    (EP) .................................... 22175521

(51) Int. Cl.
*B60Q 1/068*    (2006.01)
(52) U.S. Cl.
CPC .......... *B60Q 1/068* (2013.01); *B60Q 2200/30* (2013.01)
(58) Field of Classification Search
CPC ... B60Q 1/068; B60Q 1/0683; B60Q 2200/30
See application file for complete search history.

(56) References Cited

FOREIGN PATENT DOCUMENTS

| DE | 102014007865 A1 | 12/2015 | |
| EP | 2995500 A1 | 3/2016 | |
| EP | 3069931 A2 * | 9/2016 | ........... B60Q 1/0683 |
| FR | 3052537 A1 | 12/2017 | |
| FR | 3105353 A1 | 6/2021 | |

OTHER PUBLICATIONS

Tranlsation of Burkhard (DE 102014007865A1) (Year: 2015).*
Extended European Search Report in EP Application No. 22175521. 8, dated Nov. 3, 2022 (8 Pages).

* cited by examiner

*Primary Examiner* — Robert J May
(74) *Attorney, Agent, or Firm* — Eversheds Sutherland (US) LLP

(57) ABSTRACT

Adjustment device for a motor vehicle headlight for adjusting at least one optically relevant unit (ORU) of the motor vehicle headlight. The adjustment device includes (i) a base body fixedly arranged with respect to the ORU, (ii) a sliding body, displaceably mounted along a displacement axis on the base body and designed to engage the ORU, (iii) a drive device, fixedly arranged with respect to the ORU, preferably on the base body, and designed to engage the sliding body and displace it along the displacement axis such that during a displacement movement of the sliding body by the drive device, the ORU is moved. The sliding body is mounted on the base body by a guide device designed to guide the sliding body driven by the drive device along the displacement axis. The guide device includes at least one roller bearing, in which at least one roller body is mounted, such that the at least one roller body guides the sliding body relative to the fixed base body during the displacement of the sliding body along the displacement axis.

14 Claims, 5 Drawing Sheets

ADJUSTMENT DEVICE FOR MOTOR VEHICLE HEADLIGHT

CROSS-REFERENCE TO RELATED APPLICATIONS

This application claims priority to European Patent Application No. 22175521.8, filed May 25, 2022, which is incorporated herein by reference.

FIELD OF THE INVENTION AND DESCRIPTION OF PRIOR ART

The invention relates to an adjustment device for a motor vehicle headlight for adjusting at least one optically relevant unit of the motor vehicle headlight, wherein the adjustment device comprises the following:
- a base body, which is arranged in a fixed manner with respect to the at least one optically relevant unit to be adjusted,
- a sliding body, which is displaceably mounted along a displacement axis on the base body and is designed to engage the at least one optically relevant unit,
- a drive device, which is arranged in a fixed manner with respect to the at least one optically relevant unit to be adjusted, preferably arranged on the base body, and is designed to engage the sliding body and to displace it along the displacement axis such that during a displacement movement of the sliding body by the drive device, the at least one optically relevant unit is moved,
- wherein the sliding body is mounted on the base body by means of a guide device, wherein the guide device is designed to guide the sliding body driven by the drive device along the displacement axis on the base body.

Furthermore, the invention relates to a motor vehicle headlight comprising at least one adjustment device according to the invention.

In adjustment devices from the prior art, bodies that are designed to be displaceable in relation to each other are mounted in relation to each other via sliding surfaces. However, this results in high frictional forces and abrasion of the surfaces over a prolonged service life.

The frictional forces caused by moving the bodies over sliding surfaces together with the force-dependent play of the drive device, in particular stepper motors, lead to hysteresis in the adjustment system.

SUMMARY OF THE INVENTION

It is an object of the invention to provide an improved adjustment device for a motor vehicle headlight.

This object is achieved by virtue of the fact that the guide device comprises at least one roller bearing, wherein at least one roller body is mounted in the at least one roller bearing, wherein the at least one roller body is mounted in the at least one roller bearing in such a manner that the at least one roller body guides the sliding body relative to the fixed base body during the displacement movement of the sliding body along the displacement axis.

It can be provided that the at least one roller bearing comprises a first and a second bearing shell, wherein the first bearing shell is arranged on the base body and the second bearing shell is arranged on the sliding body,
- wherein the first and the second bearing shell jointly form the at least one roller bearing by bringing the two bearing shells together,
- and wherein the at least one roller body is mounted in the at least one roller bearing in such a manner that the at least one roller body rests against the first and the second bearing shell such that during the displacement movement of the sliding body along the displacement axis, the second bearing shell causes a rolling movement of the at least one roller body, wherein the at least one roller body guides the second bearing shell by the rolling movement during the displacement movement along the displacement axis relative to the fixed first bearing shell.

The term "bringing together" should be understood as meaning that by moving the sliding body to a predetermined position on the base body, the bearing shells are brought together such that the bearing shells together form the roller bearing.

It can be provided that the at least one roller bearing extends along a straight line, which is parallel to the displacement axis.

It can be provided that the first and second bearing shell respectively have two opposite stops along the displacement axis, wherein at a maximum stroke and a minimum stroke of the displacement movement of the sliding body, the at least one roller body abuts against a stop of the first bearing shell and a stop of the second bearing shell.

It can be provided that the guide device has at least two roller bearings.

It can be provided that the at least two roller bearings are arranged opposite an axis transverse to the displacement axis.

It can be provided that the first bearing shell is produced in one piece with the base body and/or the second bearing shell is produced in one piece with the sliding body.

It can be provided that the at least one roller body is rotationally symmetrical about at least one axis, which at least one axis is orthogonal to the displacement axis.

It can be provided that the at least one roller body is a sphere, cylinder and/or cone.

It can be provided that the at least one roller body is made from metal, preferably steel, or from plastic.

It can be provided that the adjustment device has at least one support device for supporting the sliding body on the base body against a movement transverse to the displacement axis.

It can be provided that the at least support device is a tongue and groove joint between the sliding body and the base body, wherein the tongue and groove joint extends along the displacement axis.

It can be provided that the groove is arranged on the sliding body, wherein the tongue is arranged on the base body.

It can be provided that the at least one roller body can be inserted into the roller bearing via a mounting opening, which is arranged on the first or the second bearing shell.

It can be provided that the second bearing shell of the at least one roller bearing has a connection section, which is formed elastically in such a manner that the at least one roller body arranged in the at least one roller bearing is pressed against the first bearing shell as a result of a spring force of the connection section of the second bearing shell.

The object is also achieved by a motor vehicle headlight comprising at least one adjustment device according to the invention.

BRIEF DESCRIPTION OF THE DRAWINGS

The invention is explained below in more detail based on exemplary drawings. In the drawings.

DETAILED DESCRIPTION OF EMBODIMENTS OF THE INVENTION

Figure 1:
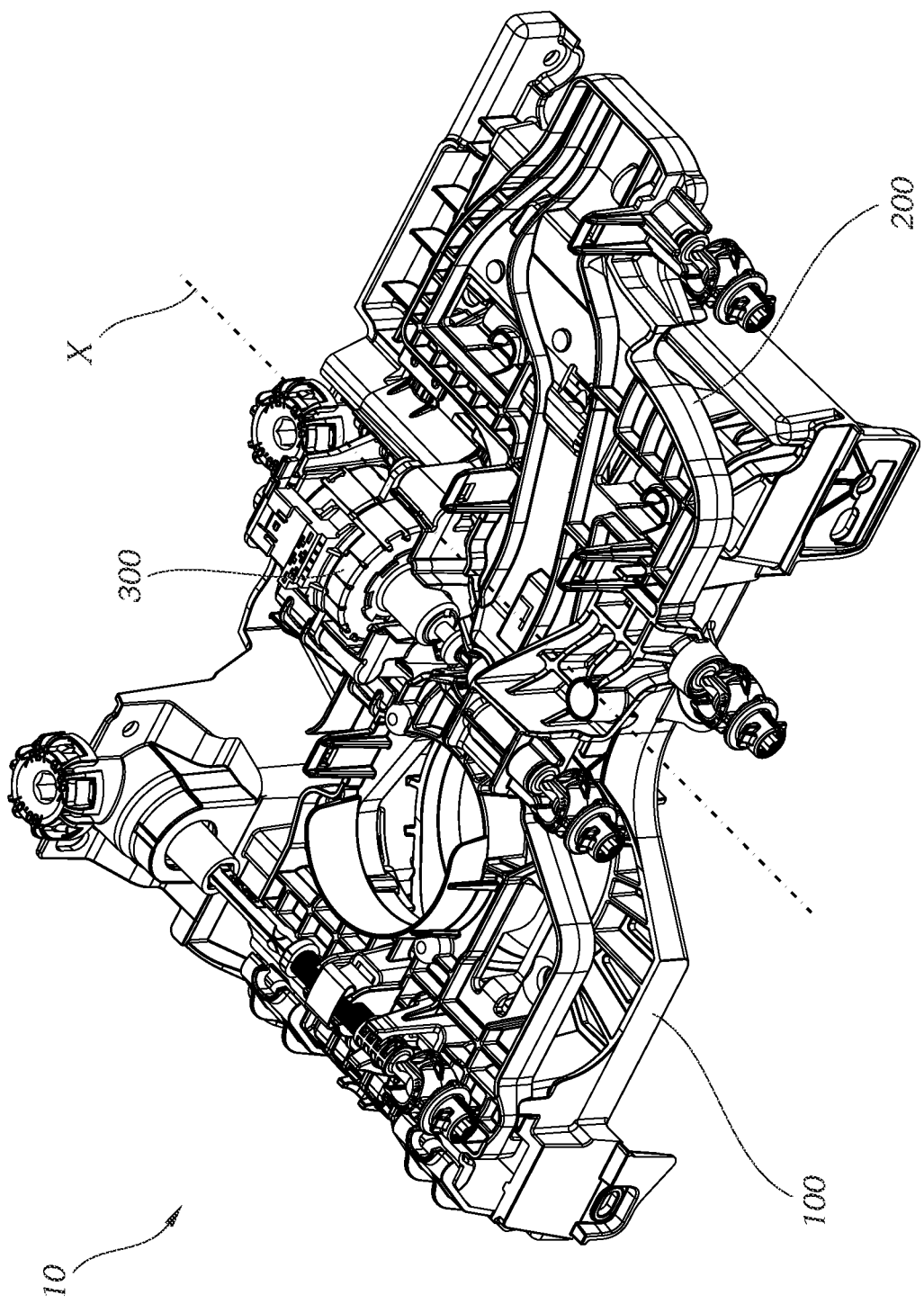
FIG. 1 shows a perspective view of an exemplary adjustment device for a motor vehicle headlight, wherein the adjustment device comprises a sliding body arranged on a base body, which sliding body can be displaced relative to the base body be means of roller bearings on the base body along a displacement axis.

FIG. 1 shows an adjustment device 10 for a motor vehicle headlight for adjusting at least one optically relevant unit of the motor vehicle headlight (not shown in the figures), wherein the adjustment device comprises a base body 100, which is arranged in a fixed manner with respect to the at least one optically relevant unit to be adjusted, and a sliding body 200, which is displaceably mounted along a displacement axis X on the base body 100 and is designed to engage the at least one optically relevant unit.

The adjustment device further comprises a drive device 300, which is arranged in a fixed manner with respect to the at least one optically relevant unit to be adjusted, preferably arranged on the base body 100, and is designed to engage the sliding body 200 and to displace it along the displacement axis X such that during a displacement movement of the sliding body 200 by the drive device 300, the at least one optically relevant unit is moved.

The sliding body 200 is mounted on the base body by means of a guide device, wherein the guide device is designed to guide the sliding body 200 driven by the drive device 300 along the displacement axis X on the base body 100.

The guide device comprises a total of six roller bearings 400 in the example shown in the figures, wherein three roller bearings are arranged opposite an axis transverse to the displacement axis X, i.e. three roller bearings per side, and wherein a roller body 410 is mounted in each roller bearing 400.

As shown in FIGS. 4, 6, 7 and 8 for example, each roller bearing 400 comprises a first and a second bearing shell 400a, 400b, wherein the first bearing shell 400a is arranged on the base body 100 and the second bearing shell 400b is arranged on the sliding body 200.

By bringing together the two bearing shells 400a, 400b, the first and the second bearing shell 400a, 400b together form a roller bearing 400, as shown in the figures.

Figure 5:
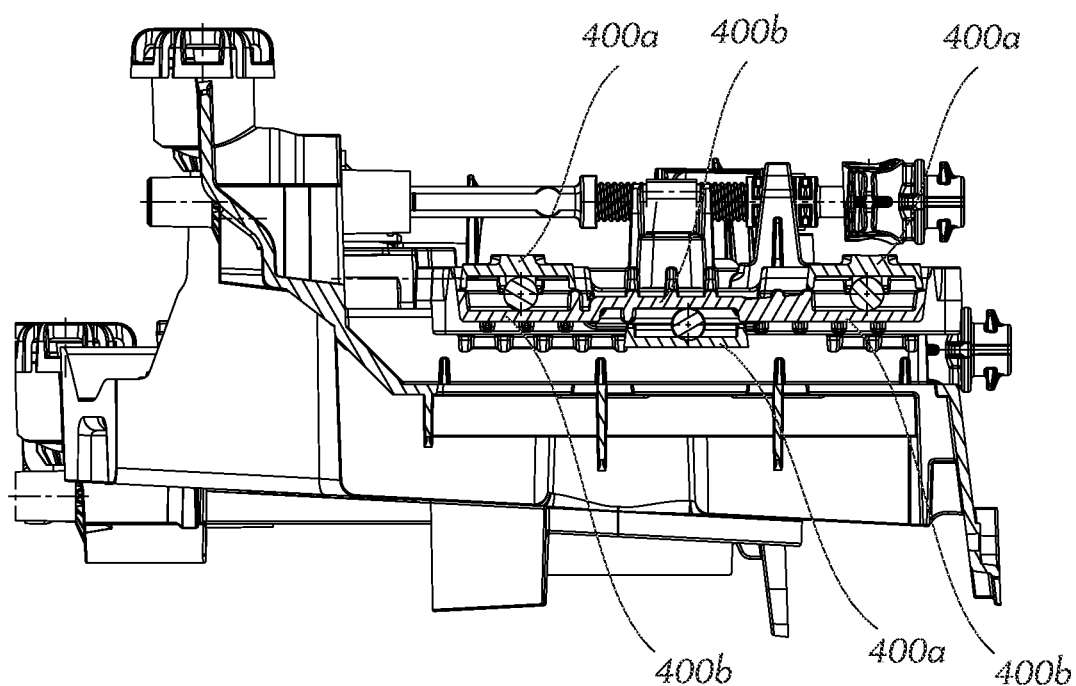
FIG. 5 shows a cross-sectional view of the adjustment device from FIG. 1 as seen from a direction transverse to the displacement axis, wherein three roller bearings of this direction or side can be seen, and wherein the sliding body is arranged in a zero position relative to the base body.

In the present example in the figures, three roller bearings 400 are arranged per side transverse to the displacement axis X, wherein in the case of the outermost roller bearings 400 per side (i.e. those that are arranged furthest away from the displacement axis X) the respective second bearing shell 400b—seen in a correctly installed state of the adjustment device in a motor vehicle—is arranged at the bottom. In the remaining roller bearing 400 per side, the second bearing shell 400b is arranged at the top, as also shown in particular in FIG. 5.

Figure 4:
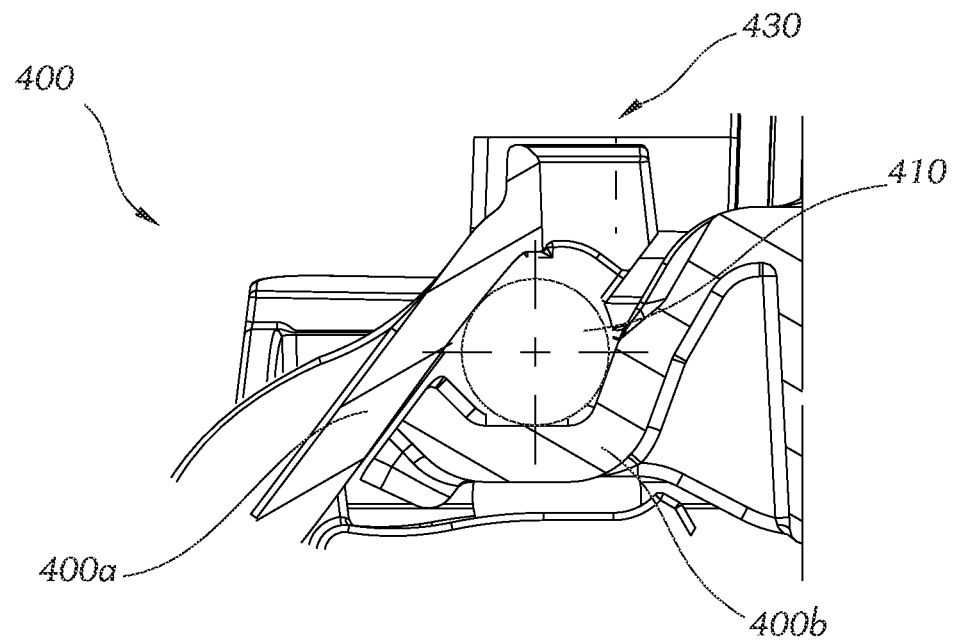
FIG. 4 shows a cross-sectional view of an exemplary roller bearing of the adjustment device from FIG. 1, wherein a roller body, in this case a sphere, is arranged between the first and second bearing shell.

The one roller body 410 is mounted in a roller bearing 400 in such a manner that the one roller body 410 rests against the first and the second bearing shell 400a, 400b (as shown in FIG. 4) such that during the displacement movement of the sliding body 200 along the displacement axis X, the second bearing shell 400b causes a rolling movement of the at least one roller body 410, wherein the at least one roller body 410 guides the second bearing shell 400b by the rolling movement during the displacement movement along the displacement axis X against or relative to the fixed first bearing shell 400a.

Figure 2:
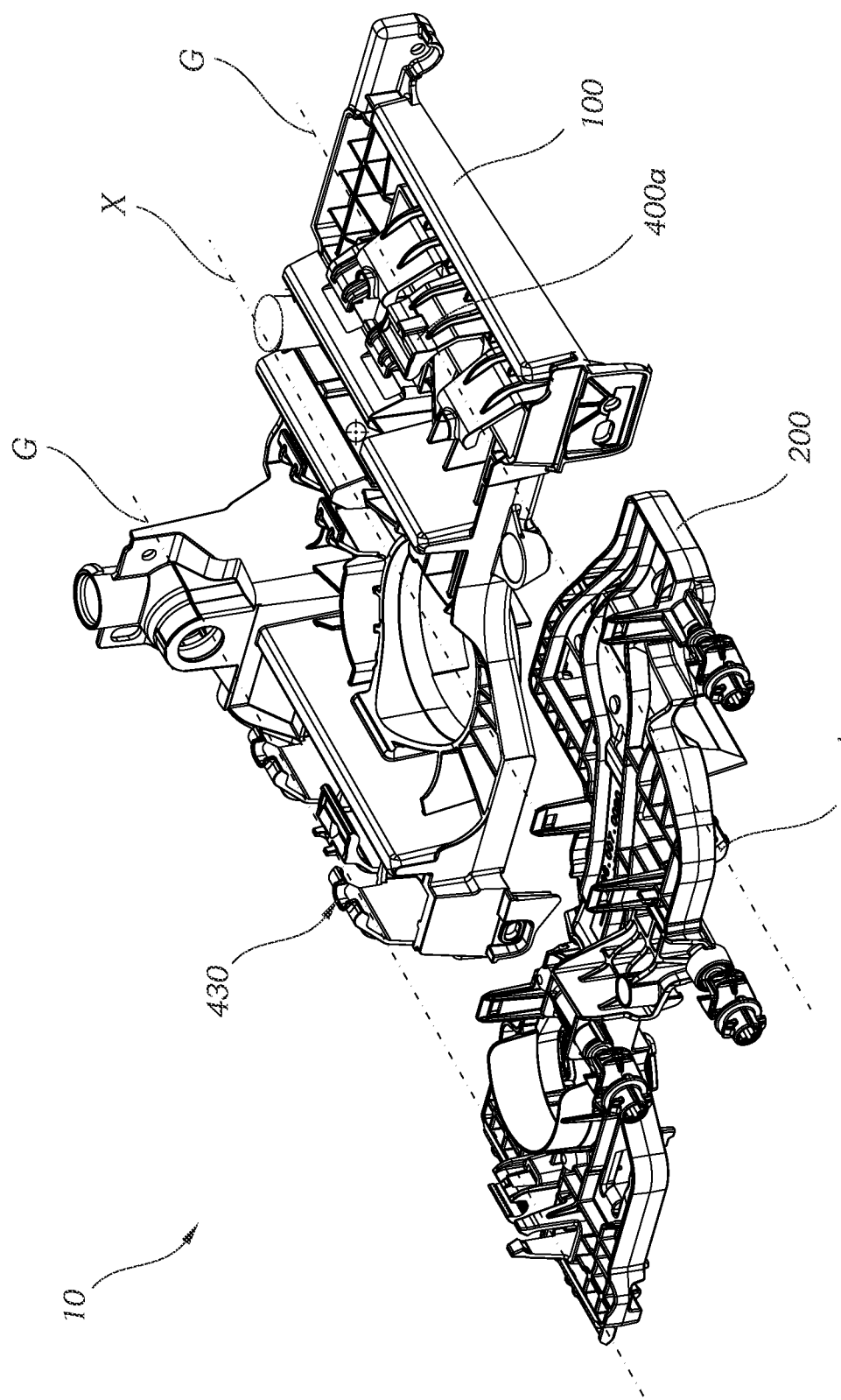
FIG. 2 shows a perspective view of the adjustment device from FIG. 1, wherein the sliding body is not shown arranged on the base body.
Figure 3:
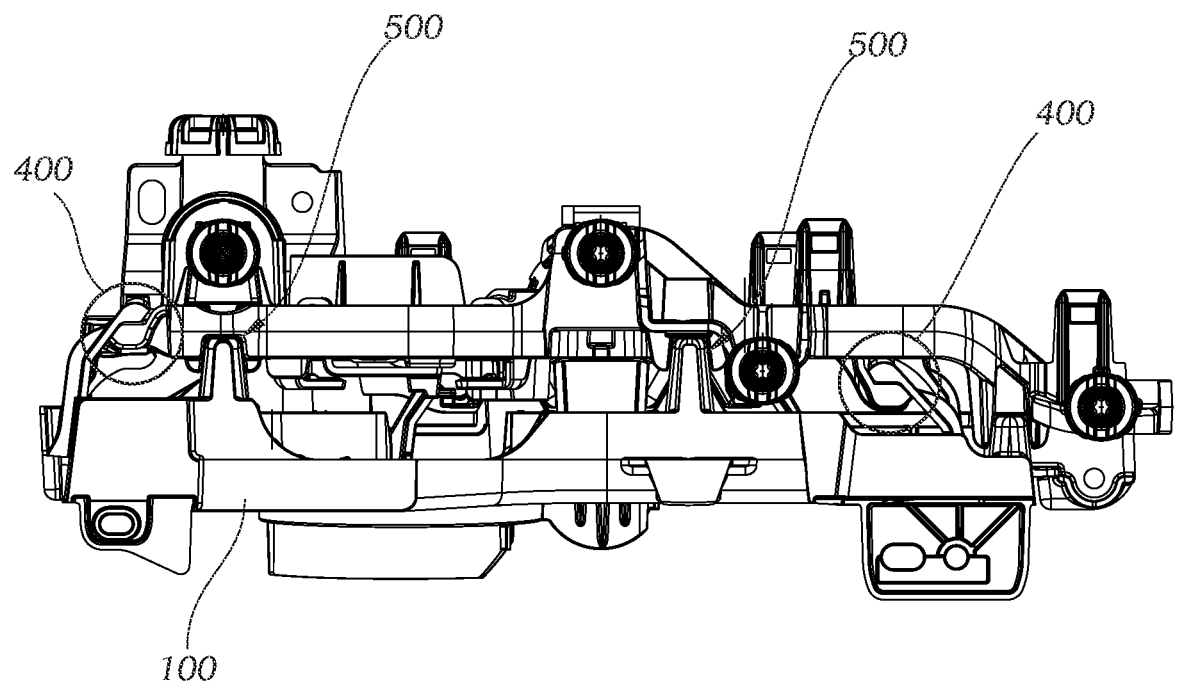
FIG. 3 shows a front view of the adjustment device from FIG. 1 along the displacement axis, wherein roller bearings are shown, which respectively have a first and a second bearing shell.
Figure 6:
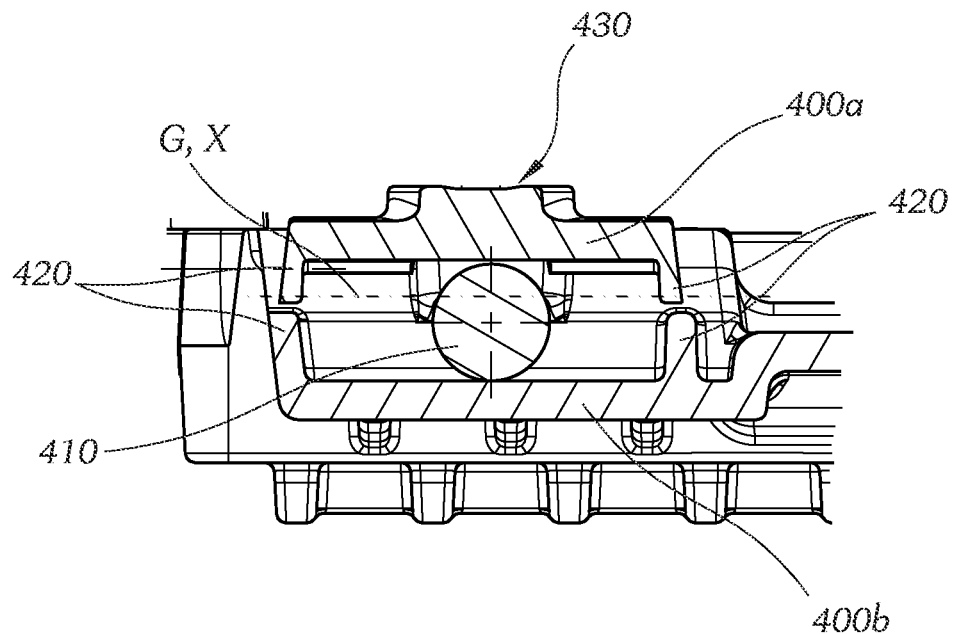
FIG. 6 shows a cross-sectional view of the roller bearing from FIG. 4 along the displacement axis, wherein the bearing shells respectively have stops at their opposite ends along the displacement axis, which are designed to limit the roller body or the movement of the sliding body along the displacement axis.

The roller bearings 400 extend along a straight line G, which is parallel to the displacement axis X, as shown in FIG. 2 and FIG. 6.

Figure 8:
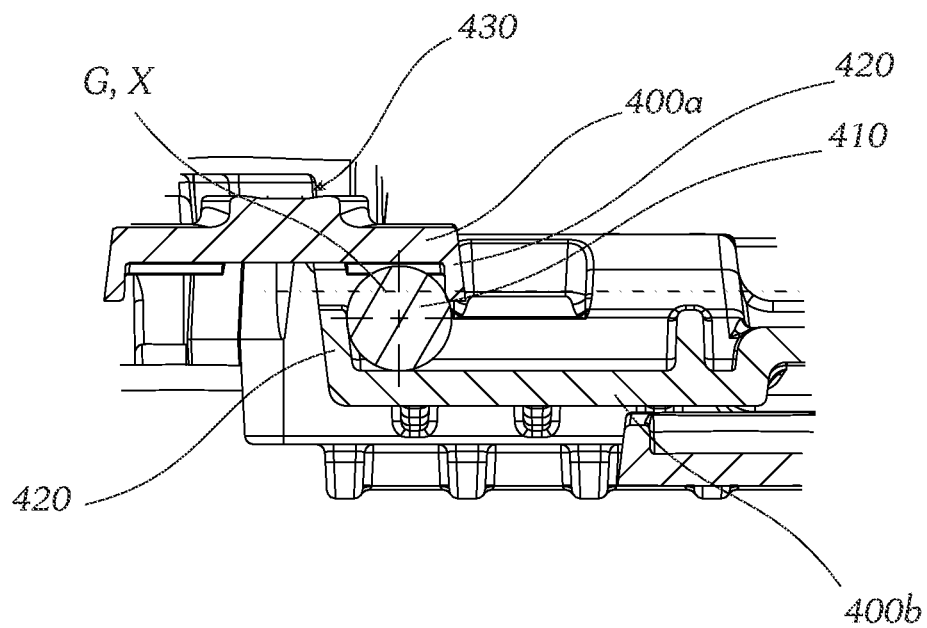
FIG. 8 shows a cross-sectional view of the roller bearing from FIG. 6 along the displacement axis, wherein the bearing shells respectively have stops at their opposite ends along the displacement axis, which are designed to limit the roller body or the movement of the sliding body along the displacement axis, wherein the sliding body is in the maximum stroke position from FIG. 7.

As shown in FIGS. 6 and 8, the first and second bearing shell 400a, 400b of a roller bearing 400 respectively have two opposite stops 420 along the displacement axis X, wherein at a maximum stroke and a minimum stroke of the displacement movement of the sliding body 200, the roller body 400 abuts against a stop 420 of the first bearing shell 400a and a stop 420 of the second bearing shell 400b.

Figure 7:
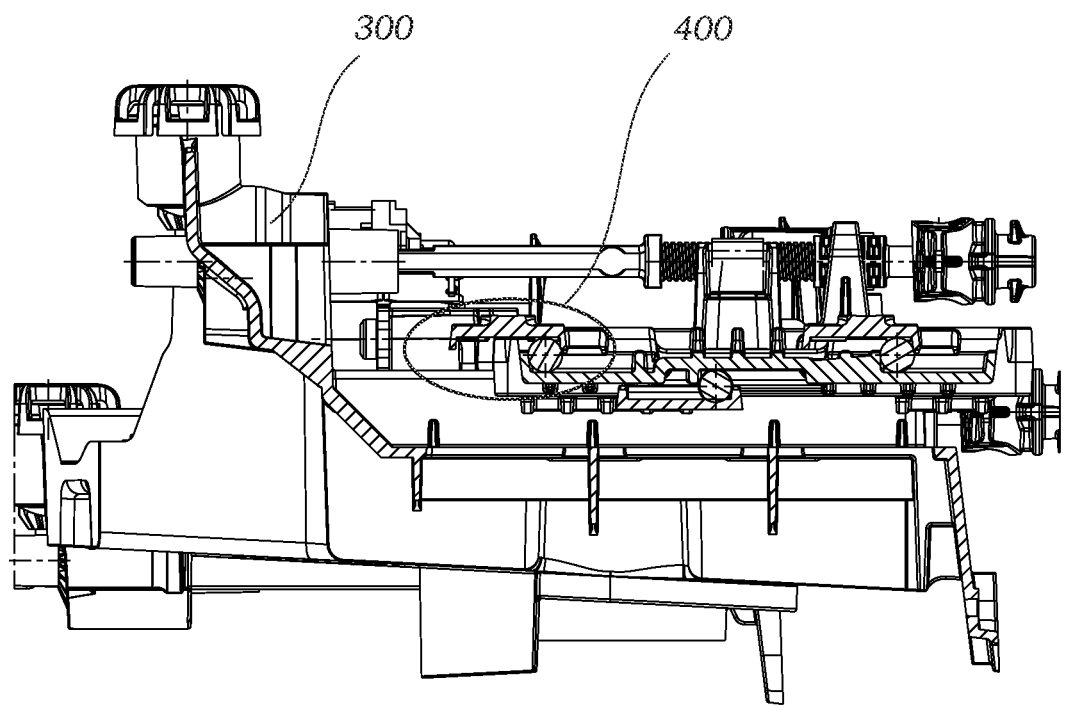
FIG. 7 shows the adjustment device from FIG. 5, wherein the sliding body is arranged in a maximum stroke position along the displacement axis relative to the base body, wherein the roller body of the roller bearings is arranged between the stops.

FIG. 7 shows such a maximum stroke along the displacement axis X of the sliding body 200 on the base body 100, wherein FIG. 8 shows a detail view of an exemplary roller bearing 400 of the sliding body 200 in the maximum stroke. FIG. 8 clearly shows that the roller body of the roller bearing 400 shown abuts against a stop 420 of the first bearing shell 400a and a stop 420 of the second bearing shell 400b, thus limiting the movement of the sliding body 200.

In the example shown in the figures, the first bearing shell 400a of the roller bearings 400 is produced in one piece with the base body 100 and the second bearing shell 400b of the roller bodies 400 is produced in one piece with the sliding body 200.

In order to insert the roller body 410 into the corresponding roller bearing 400, the first and/or the second bearing shell 400a, 400b has a mounting opening 430 (only respectively one bearing shell of a roller bearing has a mounting opening), via which the roller body 410 can be inserted into the roller bearing 400, as shown, for example, in FIG. 6.

Furthermore, the second bearing shell 400b or the first bearing shell 400a of a roller bearing 400 has a connection section, which is formed elastically in such a manner that the roller body 410 arranged in the roller bearing 400 is pressed against the first bearing shell 400a (or vice versa) as a result of a spring force of the connection section of the second bearing shell 400b. Preferably, only the second bearing shell 400b per roller bearing 400 is formed elastically in this way.

The roller body 410 in the roller bearings 400 is rotationally symmetrical about at least one axis, which at least one axis is orthogonal to the displacement axis X, wherein the roller body 410 is a sphere in the example in the figures. A variant as a cylinder and/or cone is also conceivable.

Furthermore, the roller body 410 or roller bodies 410 can be made from metal, preferably steel, or else from plastic.

In order to further support the sliding body 200 on the base body 100, the adjustment device 10 additionally comprises support devices 500 for supporting the sliding body 200 on the base body 100 against a movement transverse to the displacement axis X.

One support device 500 each is a tongue and groove joint between the sliding body 200 and the base body 100, as shown, for example, in FIG. 2, wherein the tongue and groove joint extends along the displacement axis X.

In the example shown, the groove is arranged on the sliding body 200, wherein the tongue is arranged on the base body 100.

The invention claimed is:

1. An adjustment device (10) for a motor vehicle headlight for adjusting at least one optically relevant unit of the motor vehicle headlight, wherein the adjustment device (10) comprises:
   a base body (100), which is arranged in a fixed manner with respect to the at least one optically relevant unit to be adjusted;
   a sliding body (200), which is displaceably mounted along a displacement axis (X) on the base body (100) and is designed to engage the at least one optically relevant unit;
   a drive device (300), which is arranged in a fixed manner with respect to the at least one optically relevant unit to be adjusted, preferably arranged on the base body (100), and is designed to engage the sliding body (200) and to displace it along the displacement axis (X) such that during a displacement movement of the sliding body (200) by the drive device (300), the at least one optically relevant unit is moved,
   wherein the sliding body (200) is mounted on the base body by means of a guide device, wherein the guide device is designed to guide the sliding body (200) driven by the drive device (300) along the displacement axis (X) on the base body (100),
   wherein the guide device comprises at least one roller bearing (400), wherein at least one roller body (410) is mounted in the at least one roller bearing (400), wherein the at least one roller body (410) is mounted in the at least one roller bearing (400) in such a manner that the at least one roller body (410) guides the sliding body (200) relative to the fixed base body (100) during the displacement movement of the sliding body (200) along the displacement axis (X),
   wherein the at least one roller bearing (400) comprises a first and a second bearing shell (400a, 400b), wherein the first bearing shell (400a) is arranged on the base body (100) and the second bearing shell (400b) is arranged on the sliding body (200),
   wherein the first and the second bearing shell (400a, 400b) jointly form the at least one roller bearing (400) by bringing the two bearing shells (400a, 400b) together, and
   wherein the at least one roller body (410) is mounted in the at least one roller bearing (400) in such a manner that the at least one roller body (410) rests against the first and the second bearing shell (400a, 400b) such that during the displacement movement of the sliding body (200) along the displacement axis (X), the second bearing shell (400b) causes a rolling movement of the at least one roller body (410), wherein the at least one roller body (410) guides the second bearing shell (400b) by the rolling movement during the displacement movement along the displacement axis (X) relative to the fixed first bearing shell (400a).

2. The adjustment device according to claim 1, wherein the at least one roller bearing (400) extends along a straight line (G), which is parallel to the displacement axis (X).

3. The adjustment device according to claim 1, wherein the first and second bearing shell (400a, 400b) respectively have two opposite stops (420) along the displacement axis (X), wherein at a maximum stroke and a minimum stroke of the displacement movement of the sliding body (200), the at least one roller body (410) abuts against a stop (420) of the first bearing shell (400a) and a stop (420) of the second bearing shell (400b).

4. The adjustment device according to claim 1, wherein the guide device has at least two roller bearings (400).

5. The adjustment device according to claim 4, wherein the at least two roller bearings (400) are arranged opposite an axis transverse to the displacement axis (X).

6. The adjustment device according to claim 1, wherein the first bearing shell (400a) is produced in one piece with the base body (100) and/or the second bearing shell (400b) is produced in one piece with the sliding body (200).

7. The adjustment device according to claim 1, wherein the at least one roller body (410) is rotationally symmetrical about at least one axis, which at least one axis is orthogonal to the displacement axis (X).

8. The adjustment device according to claim 1, wherein the at least one roller body (410) is a sphere, cylinder and/or cone.

9. The adjustment device according to claim 1, wherein the adjustment device (10) has at least one support device (500) for supporting the sliding body (200) on the base body (100) against a movement transverse to the displacement axis (X).

10. The adjustment device according to claim 9, wherein the at least support device (500) is a tongue and groove joint between the sliding body (200) and the base body (100), wherein the tongue and groove joint extends along the displacement axis (X).

11. The adjustment device according to claim 10, wherein the groove is arranged on the sliding body (200), wherein the tongue is arranged on the base body (100).

12. The adjustment device according to claim 1, wherein the at least one roller body (410) can be inserted into the roller bearing (400) via a mounting opening (430), which is arranged on the first or the second bearing shell (400a, 400b).

13. The adjustment device according to claim 1, wherein the second bearing shell (400b) of the at least one roller bearing (400) has a connection section, which is formed elastically in such a manner that the at least one roller body (410) arranged in the at least one roller bearing (400) is pressed against the first bearing shell (400a) as a result of a spring force of the connection section of the second bearing shell (400b).

14. A motor vehicle headlight having at least one adjustment device in accordance with claim 1.

\* \* \* \* \*